(12) United States Patent
Park

(10) Patent No.: US 9,965,120 B2
(45) Date of Patent: May 8, 2018

(54) METHOD FOR PROCESSING INPUT AND ELECTRONIC DEVICE FOR SUPPORTING THE SAME

(71) Applicant: Samsung Electronics Co., Ltd., Gyeonggi-do (KR)

(72) Inventor: Sungchul Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 73 days.

(21) Appl. No.: 14/937,496

(22) Filed: Nov. 10, 2015

(65) Prior Publication Data

US 2016/0132156 A1 May 12, 2016

(30) Foreign Application Priority Data

Nov. 12, 2014 (KR) .................. 10-2014-0157001

(51) Int. Cl.
*G06F 3/046* (2006.01)
*G06F 3/044* (2006.01)
*G06F 3/041* (2006.01)

(52) U.S. Cl.
CPC .............. *G06F 3/044* (2013.01); *G06F 3/046* (2013.01); *G06F 3/0416* (2013.01)

(58) Field of Classification Search
CPC ........ G06F 3/044; G06F 3/0416; G06F 3/046; G06F 3/0414; G06F 3/03545; G02F 1/13338
See application file for complete search history.

(56) References Cited

U.S. PATENT DOCUMENTS

| 2004/0105040 | A1* | 6/2004 | Oh | G02F 1/13338 349/12 |
|---|---|---|---|---|
| 2006/0109252 | A1* | 5/2006 | Kolmykov-Zotov | G06F 3/03545 345/173 |
| 2012/0162127 | A1 | 6/2012 | Onoda | |
| 2013/0222238 | A1 | 8/2013 | Sliger | |
| 2015/0029133 | A1* | 1/2015 | Yeh | G06F 3/03545 345/174 |
| 2015/0153845 | A1* | 6/2015 | Chang | G06F 3/03545 345/179 |
| 2016/0179249 | A1* | 6/2016 | Ballan | G06F 3/0416 345/174 |

\* cited by examiner

*Primary Examiner* — Richard Hong

(74) *Attorney, Agent, or Firm* — The Farrell Law Firm, P.C.

(57) ABSTRACT

An electronic device and method for processing an input are provided. The electronic device includes a digitizer pad formed by a single channel and a digitizer pad controller configured to supply a current to the digitizer pad, sense a change in at least one of a frequency and a phase of an electromagnetic field corresponding to a pressure intensity applied by a tip of an external input device, and determine data related to the pressure intensity applied by the external input device based on the change in the at least one of the frequency and the phase of the sensed electromagnetic field.

17 Claims, 11 Drawing Sheets

[701]

[703]

METHOD FOR PROCESSING INPUT AND ELECTRONIC DEVICE FOR SUPPORTING THE SAME

PRIORITY

This application claims priority under 35 U.S.C. § 119(a) to Korean Patent Application Serial No. 10-2014-0157001, which was filed in the Korean Intellectual Property Office on Nov. 12, 2014, the entire disclosure of which is incorporated herein by reference.

BACKGROUND

1. Field of the Disclosure

The present disclosure relates generally to an electronic device and method for processing an input, and more particularly, to processing, by an electronic device, an input provided through an external input device.

2. Description of the Related Art

Conventional portable electronic devices sense user inputs for specific functions and conduct the functions corresponding to the user inputs. For example, a user input may include a user finger or a stylus pen touching a user interface displayed on a display.

In order to detect an input position of a user input on a display of an electronic device, a number of components provided on the electronic device has increased, which, in turn increases a manufacturing time of the electronic device and manufacturing costs.

Further, additional structures have been included in the electronic device in order to efficiently sense a user input on the external input device; however, this increases a thickness and weight of the electronic device.

SUMMARY

The present disclosure has been made to address at least the above mentioned problems and/or disadvantages and to provide at least the advantages described below.

An aspect of the present disclosure provides an electronic device and method for processing an input, which may solve or alleviate the problems described above.

In accordance with an aspect of the present disclosure, there is provided an electronic device. The electronic device includes a digitizer pad formed by a single channel and a digitizer pad controller configured to supply a current to the digitizer pad, sense a change in at least one of a frequency and a phase of an electromagnetic field corresponding to a pressure intensity applied by a tip of an external input device, and determine data related to the pressure intensity applied by the external input device based on the change in the at least one of the frequency and the phase of the sensed electromagnetic field.

In accordance with an aspect of the present disclosure, there is provided an electronic device. The electronic device includes a digitizer pad formed by a plurality of channels and a digitizer pad controller configured to supply a current to the digitizer pad, identify a change in an electromagnetic field as the external input device approaches a screen window, which is placed on one side of the digitizer pad, within a threshold distance from the screen window, and identify a position region in which the external input device is sensed in the screen window based on the identified change in the electromagnetic field.

In accordance with an aspect of the present disclosure, there is provided a method of processing an input of an electronic device. The method includes supplying, by a digitizer pad controller, a current to a digitizer pad formed by a single channel, sensing, by the digitizer pad controller, change in at least one of a frequency and a phase of an electromagnetic field corresponding to a pressure intensity that is applied by a tip of an external input device, and determining, by the digitizer pad controller, data related to the pressure intensity applied by the external input device based on the change in at least one of the frequency and the phase of the sensed electromagnetic field.

In accordance with an aspect of the present disclosure, there is provided a method of processing an input of an electronic device. The method includes supplying, by a digitizer pad controller, a current to a digitizer pad formed by a plurality of channels, identifying, by the digitizer pad controller, a change in an electromagnetic field as the external input device approaches a screen window, which is placed on one side of the digitizer pad, within a threshold distance from the screen window, identifying, by the digitizer pad controller, a position region in which the external input device is sensed in the screen window based on the identified change in the electromagnetic field, and deactivating, by a processor, a function corresponding to a touch input event, when the touch input event is sensed in the position region where the external input device has not been sensed.

In accordance with an aspect of the present disclosure, there is provided a non-transitory computer-readable storage medium in which a program is stored. The program including instructions, which when executed, perform a method of processing an input of an electronic device. The method including supplying, by a digitizer pad controller, a current to a digitizer pad formed by a single channel, sensing, by the digitizer pad controller, a change in at least one of a frequency and a phase of an electromagnetic field corresponding to a pressure intensity that is applied by a tip of an external input device, and determining, by the digitizer pad controller, data related to the pressure intensity applied by the external input device based on the change.

The electronic device described herein uses a digitizer pad formed by a single channel. Thus, manufacturing costs of the electronic device can be reduced, and manufacturing convenience and cost can be improved.

The electronic device described herein includes a tip that includes a conductive material and that is installed in an external input device. Thus, an accuracy of an input-sensed position when an input of the external input device is detected by the electronic device can be improved.

BRIEF DESCRIPTION OF THE DRAWINGS

The above and other aspects, features and advantages of certain embodiments of the present disclosure will be more apparent from the following detailed description when taken in conjunction with the accompanying drawings, in which.

DETAILED DESCRIPTION

Figure 1:
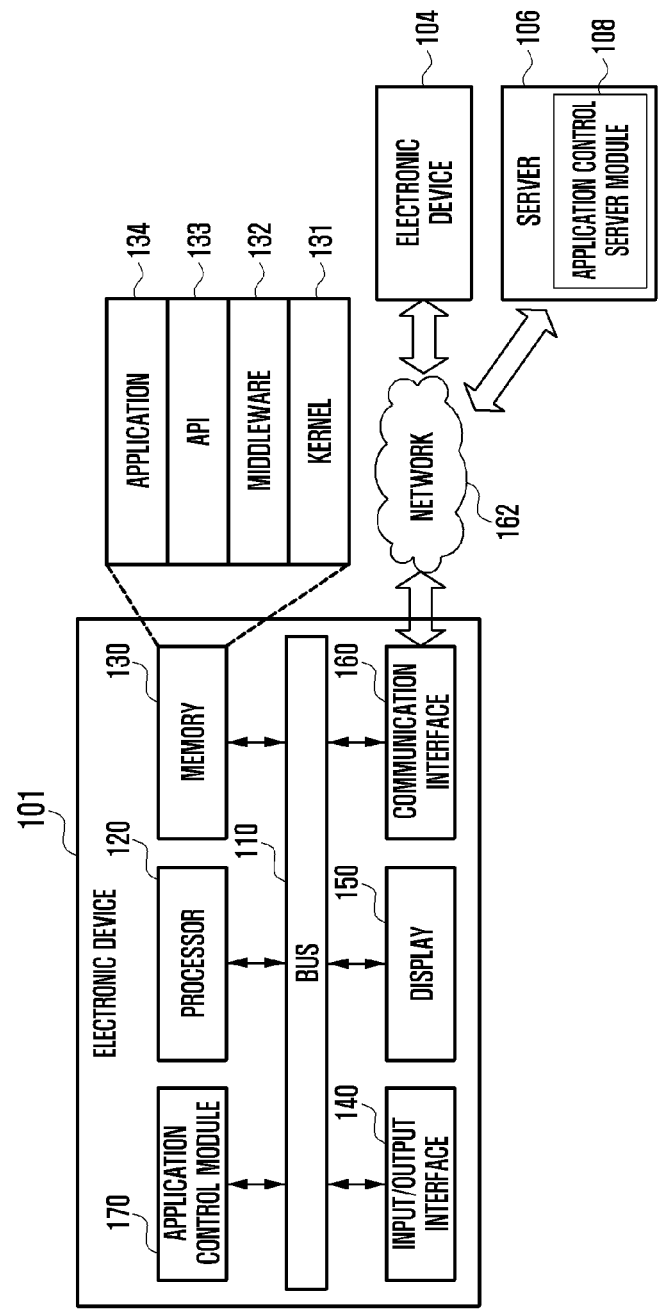
FIG. 1 illustrates a network environment including an electronic device, according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely examples. Accordingly, those of ordinary skill in the art will recognize that various changes and modifications of the embodiments described herein can be made without departing from the scope and spirit of the present disclosure. In addition, descriptions of well-known functions and constructions may be omitted for clarity and conciseness.

The terms and words used in the following description and claims are not limited to the dictionary meanings, but, are merely used by the inventor to enable a clear and consistent understanding of the present disclosure. Accordingly, it should be apparent to those skilled in the art that the following description of various embodiments of the present disclosure is provided for illustrative purposes only and not for the purpose of limiting the present disclosure as defined by the appended claims and their equivalents.

Herein, the singular forms "a", "an", and "the" are intended to include the plural forms, including "at least one", unless the content clearly indicates otherwise. "Or" means "and/or". Further, the term "and/or" includes any and all combinations of one or more of the associated listed items. The terms "comprises" and/or "comprising", or "includes" and/or "including" specify the presence of stated features, regions, integers, steps, operations, elements, and/or components, but do not preclude the presence or addition of one or more other features, regions, integers, steps, operations, elements, components, and/or groups thereof.

Although the terms "first", "second", "third", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element", "component", "region", "layer" or "section" discussed below could be also referred to as a second element, component, region, layer or section.

The term "module" as used in this disclosure may refer to a certain unit that includes one of hardware, software and firmware or any combination thereof. The module may be interchangeably used with unit, logic, logical block, component, or circuit, for example. The module may be the minimum unit, or part thereof, which performs one or more particular functions. The module may be formed mechanically or electronically. For example, the module disclosed herein may include at least one of application-specific IC (ASIC) chip, field-programmable gate arrays (FPGAs), and programmable-logic device, which have been known or are to be developed.

An electronic device described herein may be a device that performs a communication function. For example, an electronic device may be a smart phone, a tablet personal computer (PC), a mobile phone, a video phone, an e-book reader, a desktop PC, a laptop PC, a netbook computer, a personal digital assistant (PDA), a portable multimedia player (PMP), an MP3 player, a portable medical device, a digital camera, or a wearable device (e.g., a head-mounted device (HMD) such as electronic glasses, electronic clothes, an electronic bracelet, an electronic necklace, an electronic appcessory, or a smart watch).

An electronic device may also be a smart home appliance that performs a communication function. For example, an electronic device may be a TV, a digital video disk (DVD) player, audio equipment, a refrigerator, an air conditioner, a vacuum cleaner, an oven, a microwave, a washing machine, an air cleaner, a set-top box, a TV box (e.g., Samsung HomeSync®, Apple TV®, Google TV®, etc.), a game console, an electronic dictionary, an electronic key, a camcorder, or an electronic picture frame.

An electronic device may also be a medical device (e.g., magnetic resonance angiography (MRA), magnetic resonance imaging (MRI), computed tomography (CT), ultrasonography, etc.), a navigation device, a global positioning system (GPS) receiver, an event data recorder (EDR), an flight data recorder (FDR), a car infotainment device, electronic equipment for ship (e.g., a marine navigation system, a gyrocompass, etc.), avionics, security equipment, or car head unit, vehicle for head unit, an industrial, or home robot, automatic teller's machine (ATM), or point of sale (POS).

An electronic device may also be furniture or part of a building or construction having a communication function, an electronic board, an electronic signature receiving device, a projector, or various measuring instruments (e.g., a water meter, an electric meter, a gas meter, a wave meter, etc.). An electronic device disclosed herein may be one of the above-mentioned devices or any combination thereof.

The above-mentioned electronic devices are examples only and not to be considered as a limitation of this disclosure.

FIG. 1 illustrates a network environment including an electronic device, according to an embodiment of the present disclosure. Referring to FIG. 1, the electronic device 101 includes, but not limited to, a bus 110, a processor 120, a memory 130, an input/output interface 140, a display 150, a communication interface 160, and an application control module 170.

The bus 110 may be a circuit designed for connecting the above-discussed elements and communicating data (e.g., a control message) between such elements.

The processor 120 receives commands from the other elements (e.g., the memory 130, the input/output interface 140, the display 150, the communication interface 160, or the application control module 170, etc.) through the bus 110, interprets the received commands, and performs the arithmetic or data processing based on the interpreted commands.

The memory 130 stores therein commands or data received from or created at the processor 120 or other elements (e.g., the input/output interface 140, the display 150, the communication interface 160, or the application control module 170, etc.). The memory 130 includes programming modules such as a kernel 131, a middleware 132, an application programming interface (API) 133, and an application 134. Each of the programming modules may be composed of software, firmware, hardware, and any combination thereof.

The kernel 131 controls or manages system resources (e.g., the bus 110, the processor 120, or the memory 130, etc.) used for performing operations or functions of the other programming modules, e.g., the middleware 132, the API 133, or the application 134. Additionally, the kernel 131 offers an interface that allows the middleware 132, the API 133 or the application 134 to access, control or manage individual elements of the electronic device 101.

The middleware 132 performs intermediation by which the API 133 or the application 134 communicates with the kernel 131 to transmit or receive data. Additionally, in connection with task requests received from the applications 134, the middleware 132 performs a control (e.g., scheduling or load balancing) for the task request by using techniques such as assigning the priority for using a system resource of the electronic device 101 (e.g., the bus 110, the processor 120, or the memory 130, etc.) to at least one of the applications 134.

The API 133 which is an interface for allowing the application 134 to control a function provided by the kernel 131 or the middleware 132 may include, for example, at least one interface or function (e.g., a command) for a file control, a window control, an image processing, a text control, and the like.

The application 134 may include a short message service/multimedia messaging service (SMS/MMS) application, an email application, a calendar application, an alarm application, a health care application (e.g., an application for measuring blood pressure or blood glucose), an environment information application (e.g., an application for offering information about atmospheric pressure, humidity, or temperature, etc.), and the like. Additionally or alternatively, the application 134 may be an application associated with an exchange of information between the electronic device 101 and an external electronic device 104. This type application may include a notification relay application for delivering specific information to the external electronic device 104, or a device management application for managing the external electronic device 104.

For example, the notification relay application may include a function to deliver notification information created at any other application of the electronic device 101 (e.g., the SMS/MMS application, the email application, the health care application, or the environment information application, etc.) to the electronic device 104. Additionally or alternatively, the notification relay application may receive notification information from the electronic device 104 and offer it to a user. The device management application may manage (e.g., install, remove or update) a certain function (a turn-on/turn-off of an external electronic device (or some components thereof), or an adjustment of brightness (or resolution) of a display) of the electronic device 104 communicating with the electronic device 101, a certain application operating at the external electronic device 104, or a certain service (e.g., a call service or a message service) offered by the external electronic device 104.

The application 134 may include a specific application specified depending on attributes (e.g., a type) of the electronic device 104. For example, when the external electronic device 104 is an MP3 player, the application 134 may include a specific application associated with a play of music. Similarly, when the external electronic device 104 is a portable medical device, the application 134 may include a specific application associated with a health care. The application 134 may include at least one of an application assigned to the electronic device 101 or an application received from the external electronic device 104 or a server 106.

The input/output interface 140 delivers commands or data, entered by a user through an input/output unit (e.g., a sensor, a keyboard, or a touch screen), to the processor 120, the memory 130, the communication interface 160, or the application control module 170 via the bus 110. For example, the input/output interface 140 may offer data about a user's touch, entered through the touch screen, to the processor 120. Also, through the input/output unit (e.g., a speaker or a display), or the input/output interface 140 may output commands or data, received from the processor 120, the memory 130, the communication interface 160, or the application control module 170 via the bus 110. For example, the input/output interface 140 may output voice data, processed through the processor 120, to a user through the speaker.

The display 150 displays thereon various kinds of information (e.g., multimedia data, text data, etc.) to a user.

The communication interface 160 performs a communication between the electronic device 101 and the external electronic device 104 or the server 106. For example, the communication interface 160 may communicate with the electronic device 104 or the server 106 by being connected with a network 162 through a wired or wireless communication. A wireless communication may include, but not limited to, at least one of wireless fidelity (WiFi), bluetooth (BT), near field communication (NFC), global positioning system (GPS), or a cellular communication (e.g., long-term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), etc.). A wired communication may include, but not limited to, at least one of universal serial bus (USB), high definition multimedia interface (HDMI), recommended standard 232 (RS-232), or plain old telephone service (POTS).

The network 162 may be a communication network, which may include at least one of a computer network, an internet, an internet of things, or a telephone network. A protocol (e.g., transport layer protocol, data link layer protocol, or physical layer protocol) for a communication between the electronic device 101 and the external electronic device 104 or the server 106 may be supported by at least one of the application 134, the API 133, the middleware 132, the kernel 131, or the communication interface 160.

The application control module 170 processes at least part of information obtained from the other elements (e.g., the processor 120, the memory 130, the input/output interface 140, or the communication interface 160, etc.) and offers it to a user in various ways. For example, the application control module 170 recognizes information about access components equipped in the electronic device 101, store such information in the memory 130, and execute the application 134 on the basis of such information.

Figure 2:
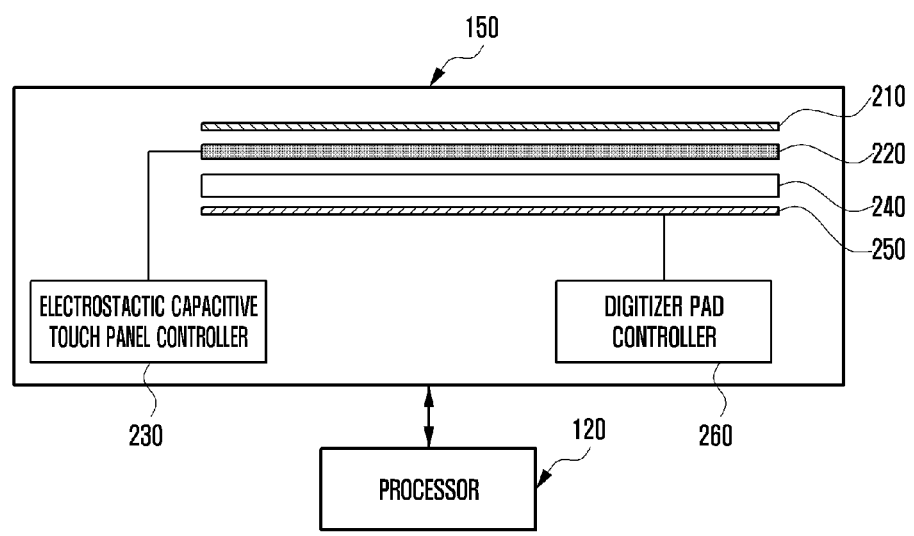
FIG. 2 illustrates a display of an electronic device, according to an embodiment of the present disclosure.

FIG. 2 illustrates a display of an electronic device, according to an embodiment of the present disclosure.

Referring to FIG. 2, the display 150 of the electronic device 101 includes a screen window 210, an electrostatic capacitive touch panel 220, an electrostatic capacitive touch panel controller 230, a display panel 240, a digitizer pad 250, and a digitizer pad controller 260.

The screen window 210 of the display 150 may be a region that can be touched by an external input (e.g., a touch input by an external input device 600 (see FIG. 6, for example), or a touch input by a dielectric body (e.g., a human finger or palm)). For example, the screen window 210 may be glass that is processed with a reinforcement coating or an oleophobic coating. The screen window 210 may be formed of at least one of alumina, silica, and sapphire or other suitable material.

The screen window 210 can be made of a transparent material and may be attached to a touch panel or fixed to a body that forms the exterior of the electronic device 101. For example, the screen window 210 may be attached to the electrostatic capacitive touch panel 220 using an adhesive. The adhesive may be, for example, a super view resin or an optically clear adhesive tape.

The electrostatic capacitive touch panel 220 may include a transmission electrode and a reception electrode. The electrostatic capacitive touch panel 220 receives a voltage supplied from the electrostatic capacitive touch panel controller 230 and forms an electromagnetic field based on the received voltage. Here, the reception electrode may acquire electric charges of which the quantity is variable according to the proximity or contact of the external input device 600 or a dielectric body (e.g., a human finger) with respect to the screen window 210. For example, the voltage received through the reception electrode of the electrostatic capacitive touch panel 220 may vary depending on the contact or proximity (hovering) of a dielectric body (e.g., a human finger).

The electrostatic capacitive touch panel controller 230 performs a control such that a voltage is supplied to the electrostatic capacitive touch panel 220, which is placed on one side of the screen window 210. The electrostatic capacitive touch panel controller 230 acquires electric charges of which the quantity is changed as a conductive tip 610, which is mounted on a portion of the external input device 600, comes close (or approaches) the screen window 210, within a threshold distance from the screen window 210.

The electrostatic capacitive touch panel controller 230 determines a position where the conductive tip 610 of the external input device 600 is sensed based on the quantity of the electric charges (e.g., the voltage) acquired from the reception electrode.

The display panel 240 displays a user interface. For example, when a touch input event for any application is sensed, the display panel 240 displays an application corresponding to the sensed touch input event. The display panel 240 displays a user interface corresponding to pressure data under the control of the processor 120.

The digitizer pad 250 may be formed with a single channel. A portion of the single channel (e.g., an antenna) may be connected to a ground that is a reference point of the voltage, and the other end of the single channel may be connected to the digitizer pad controller 260. As alternating current is supplied from the digitizer pad controller 260, the digitizer pad 250 generates an electromagnetic field. The digitizer pad controller 260 supplies a current (e.g., alternating current) to the digitizer pad 250. Based on the supplied current, the digitizer pad 250 generates the electromagnetic field, and as the external input device 600 approaches the generated electromagnetic field, an electromagnetic induction phenomenon occurs. As the electromagnetic induction phenomenon occurs, current flows in the external input device 600, which includes a resonance circuit unit. As the current flows in the external input device 600, an electromagnetic field is formed, and the digitizer pad controller 260 senses the formed electromagnetic field.

The digitizer pad controller 260 receives the electromagnetic field generated by the electromagnetic induction phenomenon of the external input device 600. The digitizer pad controller 260 supplies a current to the digitizer pad 250 and/or receives the electromagnetic field generated by the external input device 600, through a movement of a switch. For example, when the digitizer pad controller 260 supplies the current to the digitizer pad 250 by the connection of the switch, a current is induced in the external input device 600 so that the circuit of the external input device 600 is operated, and when an electromagnetic field is generated by the resonance circuit unit, the digitizer pad controller 260 receives the electromagnetic field generated by the external input device 600 through the switching of the switch.

The digitizer pad controller 260 senses a change in frequency and/or phase of the electromagnetic field which corresponds to the pressure intensity of the external input device 600 with respect to the screen window 210. For example, when the external input device 600 is a stylus pen, the digitizer pad controller 260 may sense a change in at least one of frequency and phase of the electromagnetic field which corresponds to a pushing force by the stylus pen (e.g., a force applied per a unit area, or a writing pressure applied to a predetermined region of the screen window 210). Here, the pressure intensity refers to a pushing force of the external input device 600 which is applied per unit area. The pressure intensity may be divided into, for example, 1024 levels, 2048 levels, or 4096 levels. Here, when the pressure intensity is divided into 1024 levels, the strongest intensity may be set to level 1024 and the weakest pressure intensity may be set to level 0.

The digitizer pad controller 260 may determines pressure data of the external input device 600 based on a change in at least one of the frequency and the phase of the sensed electromagnetic field. For example, when the pressure intensity of the external input device 600 in relation to the screen window 210 corresponds to level 400 with reference to the 1024 levels, the digitizer pad controller 260 determines the sensed pressure data as data corresponding to level 400.

The digitizer pad controller 260 transfers the determined pressure data to the processor 120. The processor 120 performs a control such that a user interface corresponding to the transferred pressure data is displayed on the display 150. For example, upon receiving pressure data corresponding to level 300 with reference to the 1024 levels, the processor 120 performs a control such that a user interface having a thickness of 30 mm is displayed, and upon receiving pressure data corresponding to level 400 with reference to the 1024 levels, the processor 120 performs a control such that a user interface having a thickness of 50 mm. The processor 120 performs a control such that the display 150 displays graphic user interfaces having different thicknesses based on transferred pressure data.

The digitizer pad controller 260 determines whether the external input device 600 exists within the threshold distance from the screen window 210 based on the change of the sensed electromagnetic field. The digitizer pad controller 260 identifies the position region in which external input device 600 is sensed in the screen window 210, based on the determination result as to whether the external input device 600 exists within the threshold distance from the screen window 210.

The digitizer pad controller 260 transfers the information as to whether the external input device 600 exists within the threshold distance from the screen window 210 to the processor 120. Here, the information as to whether the external input device exists within the threshold distance may include information relating to hovering of the external input device 600. Based on the received information, the processor 120 performs switching to the external input device mode, in which only the input related to the external input device 600 is received. For example, upon receiving the information indicating that external input device 600 exists within the threshold distance from the screen window 210, the processor 120 performs a control such that a function corresponding to an input (e.g., by a dielectric body (e.g., a palm of a human body)), other than an input by the external input device 600, is deactivated.

The digitizer pad controller 260 transfers the information concerning the position region, in which the external input device 600 has been sensed, to the processor 120. When a touch input event is sensed in the position region, in which the external input device 600 has not been sensed, the processor 120 performs a control such that a function corresponding to the sensed touch input event is deactivated.

When a touch input event is sensed in a position region exceeding the threshold distance from the position region, in which the external input device 600 has been sensed, the processor 120 deactivates a function corresponding to the sensed touch input event. For example, when the screen region of the screen window 210 is divided into regions, each of which has a predetermined area, the regions may be referred to as a first quadrant, a second quadrant, a third quadrant, and a fourth quadrant, respectively. For example, when a separate input (e.g., an input performed by a finger or a palm of a human body) is sensed in at least one quadrant among the second quadrant, the third quadrant, and the fourth quadrant rather than in the first quadrant, in which the external input device 600 has been sensed, the processor 120 performs a control such that a function corresponding to the sensed separate input is deactivated.

The processor 120 receives area information, voltage information, and concentration information of the position region, in which an external input (e.g., an input performed by the external input device 600 or a touch input performed by a part of a human body) is sensed, from the digitizer pad controller 260. The processor 120 compares the area information, the voltage information, and the concentration information of the position region, in which the external input device 600 has been sensed, to the area information, the voltage information, and the concentration information of the position region, in which the external input device 600 has not been sensed.

The area information of the position region may be area information, in which the conductive tip 610 of the external input device 600 is sensed on the screen window 210, or area information, in which a touch input event performed by an object capable of changing the amount of charges (e.g., a finger or a palm of a human) is sensed on the screen window 210. For example, the area, in which the conductive tip 610 of the external input device 600 is sensed, may be smaller than the area in which a touch input event by the object is sensed.

Here, the voltage information of the position region may be a voltage received by the reception electrode. For example, the voltage sensed as the external input device 600 approaches the screen window 210 or comes in contact with the screen 210 may be 0.01V, and the sensed voltage, as an object capable of changing the amount of charges (e.g., a finger or a palm of a human) approaches the screen window 210 or comes in contact with the screen window 210, may be 0.5V.

Here, the concentration information of the position region may be a distribution of inputs or the number of inputs sensed on the screen window 210. For example, the external input device 600 includes the single conductive tip 610, and the object capable changing the amount of charges (e.g., a finger or a palm of a human) may perform a plurality of touch inputs on the screen window 210.

The processor 120 compares the area information, the voltage information, and the concentration information of the position region, in which the external input device 600 has been sensed, to the area information, the voltage information, and the concentration information of the position region, in which a touch input event of the object capable of changing the amount of charges (e.g., a finger or a palm of a human) has been sensed, and may deactivate a function corresponding to the touch input event based on the comparison result. For example, when the area information value of a sensed position region is smaller and the concentration information includes a single value, the processor 120 determines the region as the position region, in which the external input device 600 is sensed, and may deactivate a function corresponding to an input event sensed in the other region.

For example, when a voltage acquired from a reception electrode in one region, in which an input event has been sensed, corresponds to a pre-set voltage (e.g., 0.05 V), the processor 120 determines the sensed region as the region, in which the external input device 600 has been sensed, and may deactivate a function corresponding to an input event sensed in the other region. For example, when a memo application is activated, and thus a touch input event by a palm of a human body is sensed among text inputs by the external input device 600, the processor 120 performs a control such that a function corresponding to the sensed touch input event is deactivated.

The electronic device 101 may include a digitizer pad 250 that is formed by connecting at least two channels to at least one of a repeater, a combiner, and a splitter. In this instance, the electronic device 101 includes a digitizer pad controller configured to supply a current to the digitizer pad 250, sense a change of a frequency or a phase of an electromagnetic field corresponding to a pressure intensity applied by the tip 610 of the external input device 600, and determine the pressure data of the external input device 600 based on the change.

Figure 3:
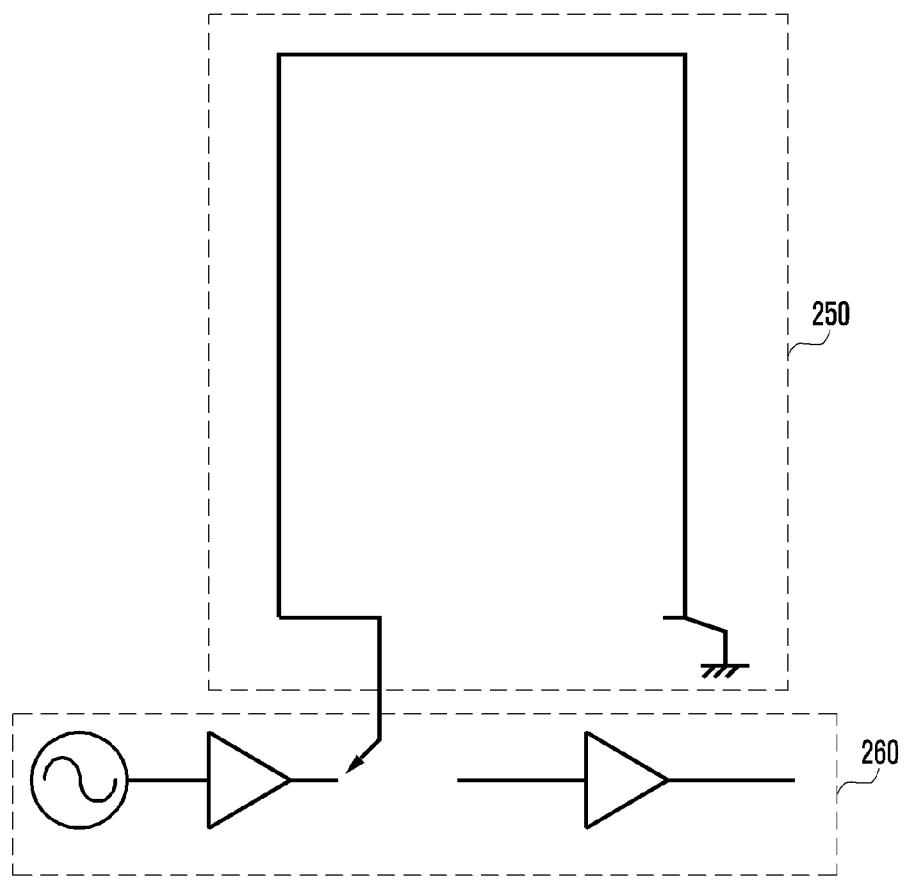
FIGS. 3, 4 and 5 illustrate displays of electronic devices, according to an embodiment of the present disclosure.
Figure 4:
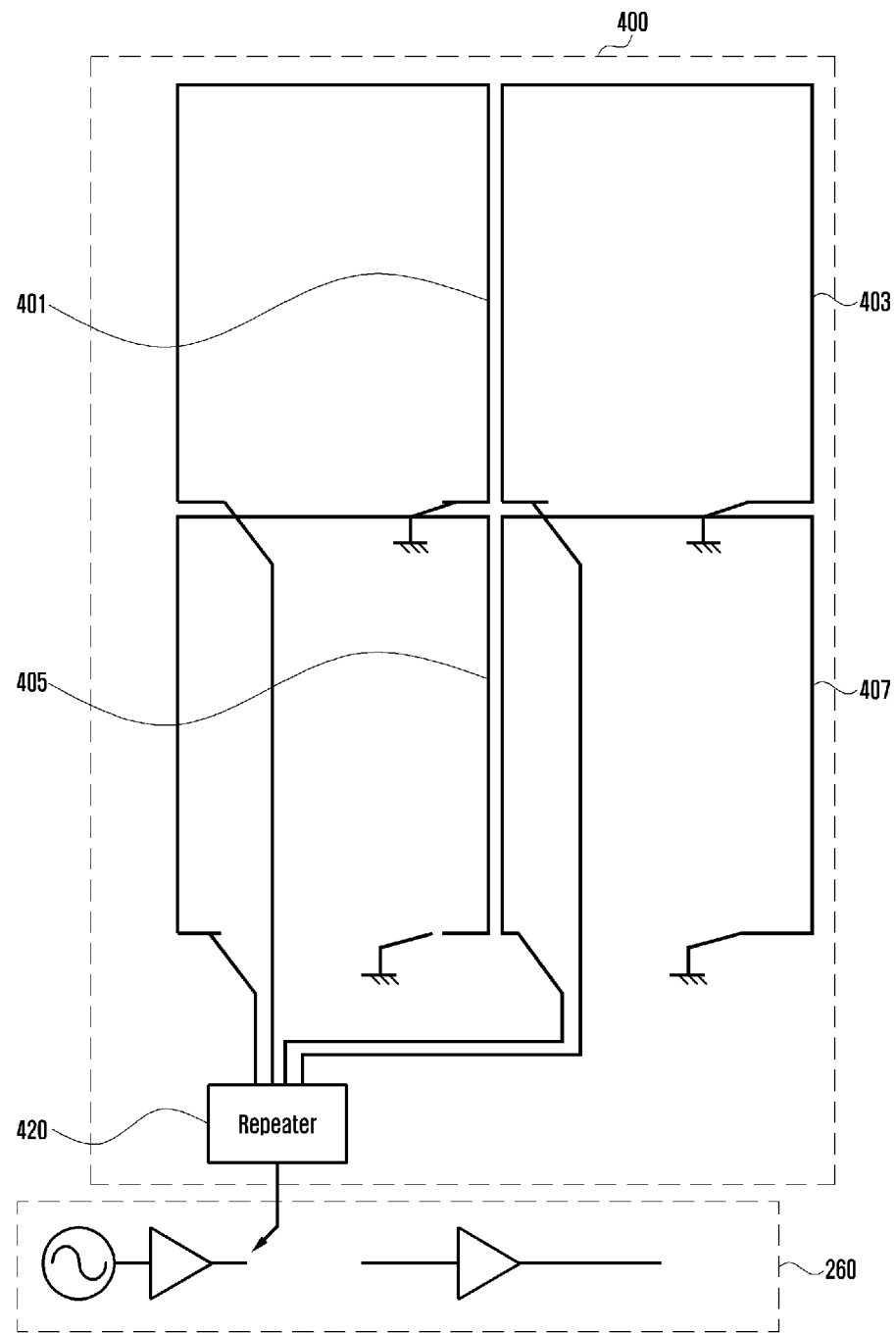
Figure 5:
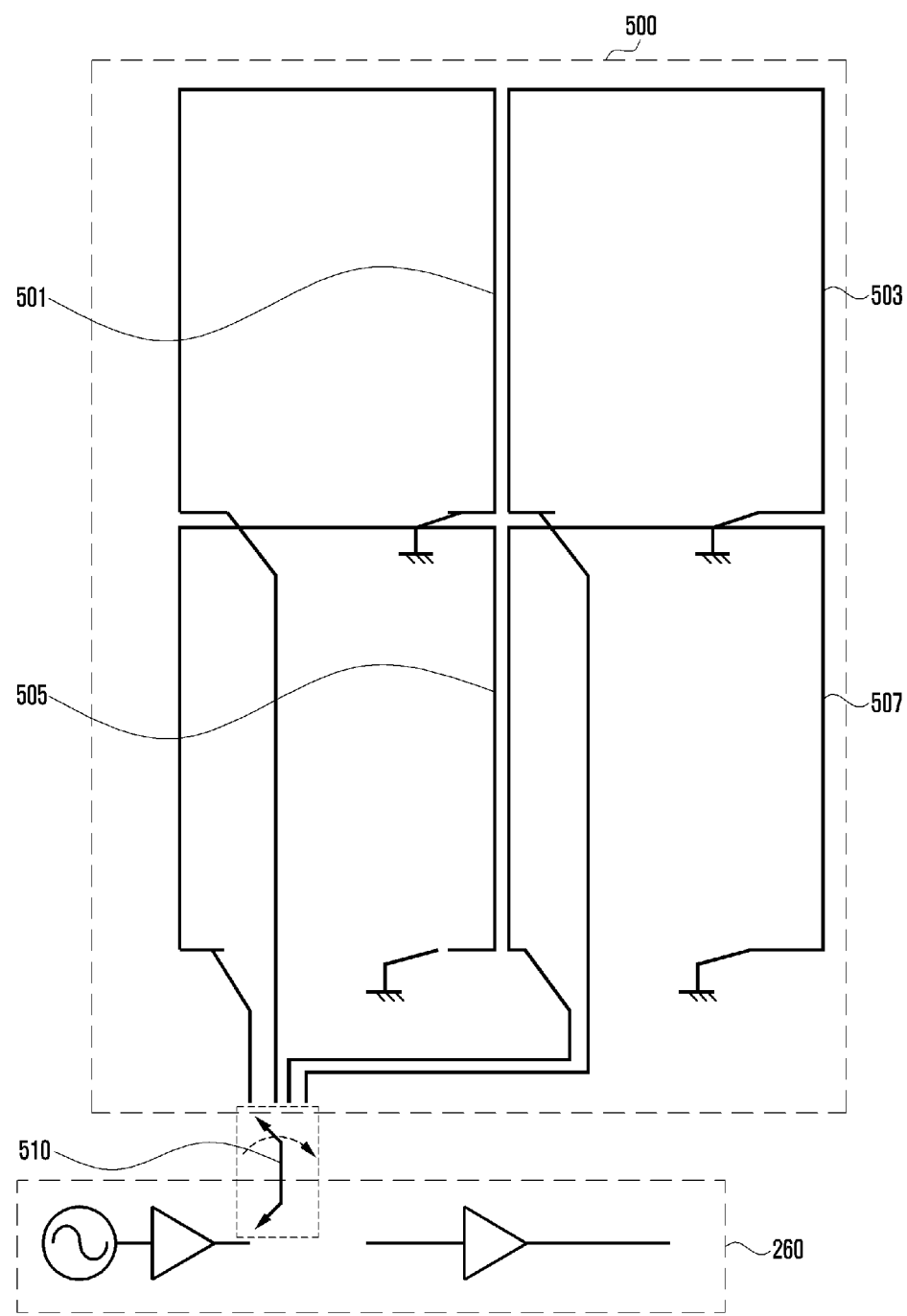

FIGS. 3-5 are diagrams illustrating the display 150 of the electronic device 101, according to an embodiment of the present disclosure.

Referring to FIG. 3, as noted above, the digitizer pad 250 may be formed by a single channel (e.g., an antenna). In this instance, a portion of the single channel is connected to a ground that is a reference point of the voltage, and the other end of the single channel may be connected to the digitizer pad controller 260. The digitizer pad 250 receives an alternating current supplied from the digitizer pad controller 260 and generates an electromagnetic field according to the received alternating current.

Referring to FIG. 4, in the instance where the digitizer pad 250 is formed by a plurality of channels, a portion of each of channels (e.g., antennas, 401, 403, 405, and 407) may be connected to a repeater 420, a combiner, and a splitter. The other end of each of the channels may be connected to a ground which is a reference point of the voltage. The channels receive the alternating current supplied from the digitizer pad controller 260 generate an electromagnetic field according to the received alternating current. Here, the repeater 420, the combiner, and the splitter may simultaneously supply the alternating current received from the digitizer pad controller 260 to each of the channels.

Referring to FIG. 5, a portion of each of channels (e.g., antennas 501, 503, 505, and 507) may be connected to a portion of a switch unit 510. The other end of each of the channels may be connected to a ground which is a reference point of the voltage. The digitizer pad controller 260 may sequentially supply an alternating current to channels in a predetermined time interval through the switch unit 510. Any one of the channels to which the current is supplied from the digitizer pad controller 260, may generate an electromagnetic field according to the received alternating current.

When a touch input event is sensed in a position region that is different from the region in which external input device 600 has been sensed, the processor 120 deactivates a function corresponding to the touch input event. For example, a screen region of the screen window 210 is divided into regions of the channels (e.g., antennas 501, 503, 505, and 507), and the regions of the channels may be referred to as a first quadrant, a second quadrant, a third quadrant, and a fourth quadrant, respectively. For example, when a separate input (e.g., an input performed by a dielectric body (e.g., a finger or a palm of a human body) is sensed in at least one of the second quadrant, the third quadrant, and the fourth quadrant other than the first quadrant, in which the external input device 600 has been sensed, the processor 120 performs a control such that a function corresponding to the sensed separate input is deactivated.

Figure 6:
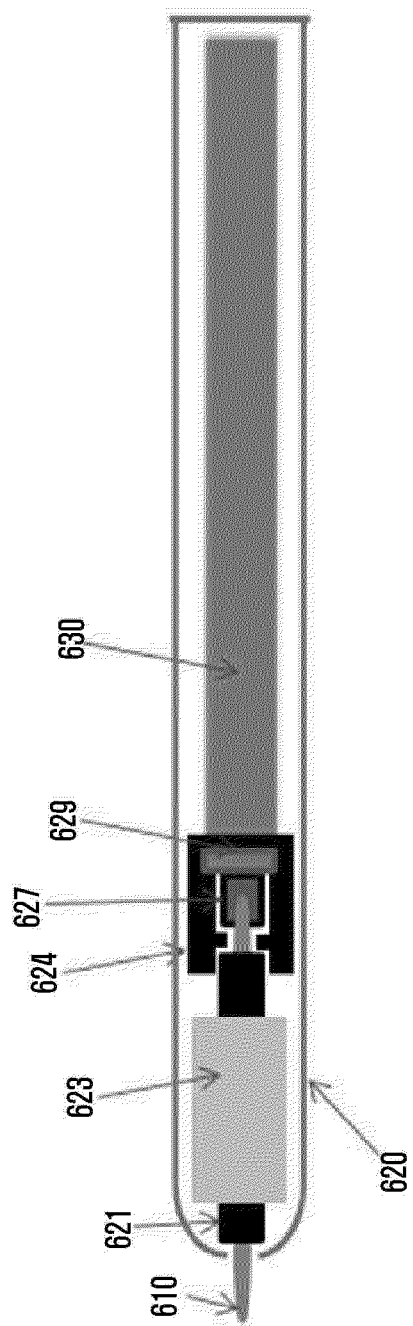
FIG. 6 illustrates an external input device, according to an embodiment of the present disclosure.

FIG. 6 is a diagram illustrating the external input device 600, according to an embodiment of the present disclosure.

The external input device 600 includes the conductive tip 610 (tip 610) and an external housing 620.

The tip 610 may be installed to protrude (or extend) from an opening located at a distal end of the external housing 620. The tip 610 may be made of or formed from a conductive material, or a conductive material may be installed to, mounted on, attached to, adhered to, fused to, or welded to a surface of the tip 610, which may be in the form of a plastic tip. For example, the tip 610 may be formed by adhering a plastic tip to a conductive material using a doubled-sided tape, an adhesive, or the like.

The tip 610 is receivable in or movable to an accommodation space (or area, cavity, notch, void, etc.) that is formed within the external housing 620. The external housing 620 includes a ferrite core 621, a coil 623, a guide unit 624, a support unit 627, a variable capacitor 629, and a printed circuit board 630, which are supported in the accommodation space of the external housing 620.

A resonance circuit unit includes the coil 623 that functions as an inductor and a capacitor that is mounted on the printed circuit board 630. The resonance circuit unit may further include an inductor that is mounted on the printed circuit board 630. The coil 623 and the capacitor are connected to each other in parallel, i.e., a parallel circuit. When the resonance circuit unit includes an inductor that is mounted on the printed circuit board 630, the inductor can be connected to the coil 623 in series, i.e., a series circuit. The resonance circuit unit generates an electromagnetic induction phenomenon when the external input device 600 approaches the screen window 210 so that a current is generated. The resonance circuit unit forms a magnetic field using the generated current.

The ferrite core 621 and the coil 623 are coupled to the tip 610. For example, the tip 610 extends through a space (notch, hole, cavity, void, etc.) that is provided through the ferrite core 621. The space is in general alignment with the open end of the external housing 620. The guide unit 624 may be formed to enclose the support unit 627 and the variable capacitor 629. The support unit 627 is connected to a proximal end of the tip 610 for supporting the tip 610 in a fixed configuration. The variable capacitor 629 is mounted on a portion of the support unit 627 such that when a pressure is applied to the tip 610, the pressure is transferred to the variable capacitor 629 through the support unit 627. Depending on a difference of the pressure applied to the tip 610, the capacitor value may vary. The printed circuit board 630 is electrically connected to a portion of the guide unit 624.

The external input device 600 can include a conductor that is mounted (or supported) in accommodation space of the external housing 620. The conductor includes a proximal end that connects to the printed circuit board and a distal end that is seated within a cavity of the tip 610 for connecting the conductor to the tip 610. In this instance, the ferrite core 621, the coil 623, the guide unit 624, the support unit 627, and the variable capacitor 629 may be connected in a manner as described above.

Figure 7:
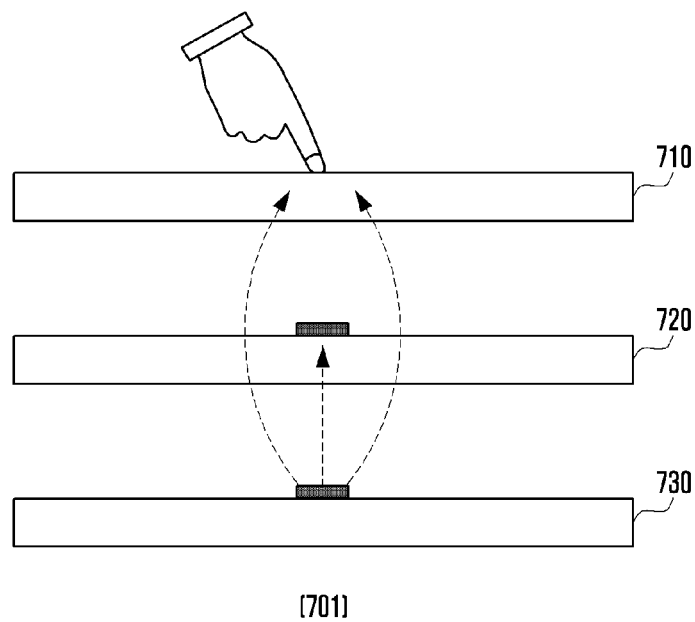
FIG. 7 illustrates a method of detecting an input of the external input device, according to an embodiment of the present disclosure.
Figure 7:
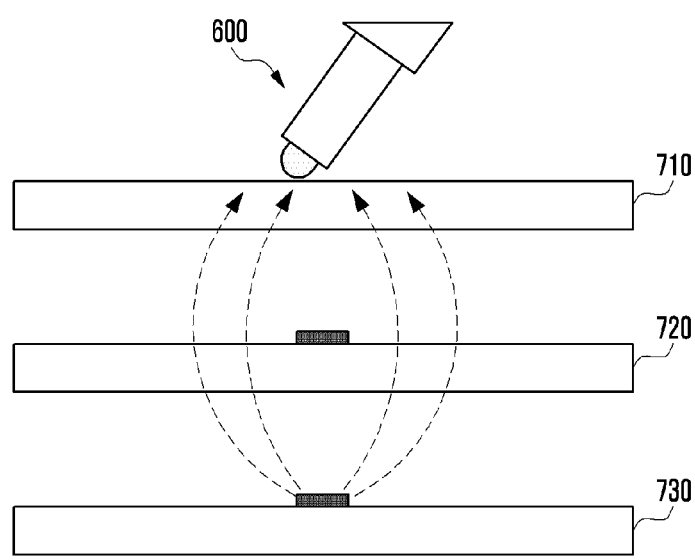

FIG. 7 illustrates a method of detecting an input of the external input device 600, according to an embodiment of the present disclosure.

When an input event for one region of the screen window 710 is sensed, the electrostatic capacitive touch panel controller 230 may determine whether the input event is an input event by the external input device 600 or an input event by an external dielectric body (e.g., a finger of a human). The electrostatic capacitive touch panel controller 230 may include a reception electrode 720 and a transmission electrode 730.

Referring to reference number [701] of FIG. 7, when an input event by an external dielectric body (e.g., a finger of a human) is sensed in one region of the screen window 710, the reception electrode 720 may receive a first voltage. Referring to reference number [703] of FIG. 7, when an input event by the external input device 600 is sensed in one region of the screen window 710, the reception electrode 720 may receive a second voltage. Based on a difference in the amount of charges which is caused by the materials of the external dielectric body (e.g., a finger of a human) and the conductive tip 710 of the external input device 600, the reception electrode 720 may acquire first and second voltages of which the values are different from each other. For example, the first voltage may be 0.5V and the second voltage may be 0.01V. Based on the difference of the voltages acquired by the reception electrode 720, the electrostatic capacitive touch panel controller 230 may determine the object sensed on the screen window 710.

The electrostatic capacitive touch panel controller 230 may determine whether the input event is an input by the external input device 600 or an input by the external dielectric body (e.g., a human finger) by comparing a voltage value previously stored in the memory 130 and the received voltage. For example, the memory 130 may store a voltage of 1.0V when there is no touch input, a voltage of 0.5V when an input is performed by a dielectric body, and a voltage of 0.01V when an input is performed by the external input device 600. The electrostatic capacitive touch panel controller 230 may determine an object sensed on the screen window 710 by comparing the voltage stored in the database stored in the memory 130 and the voltage received through the reception electrode.

Figure 8:
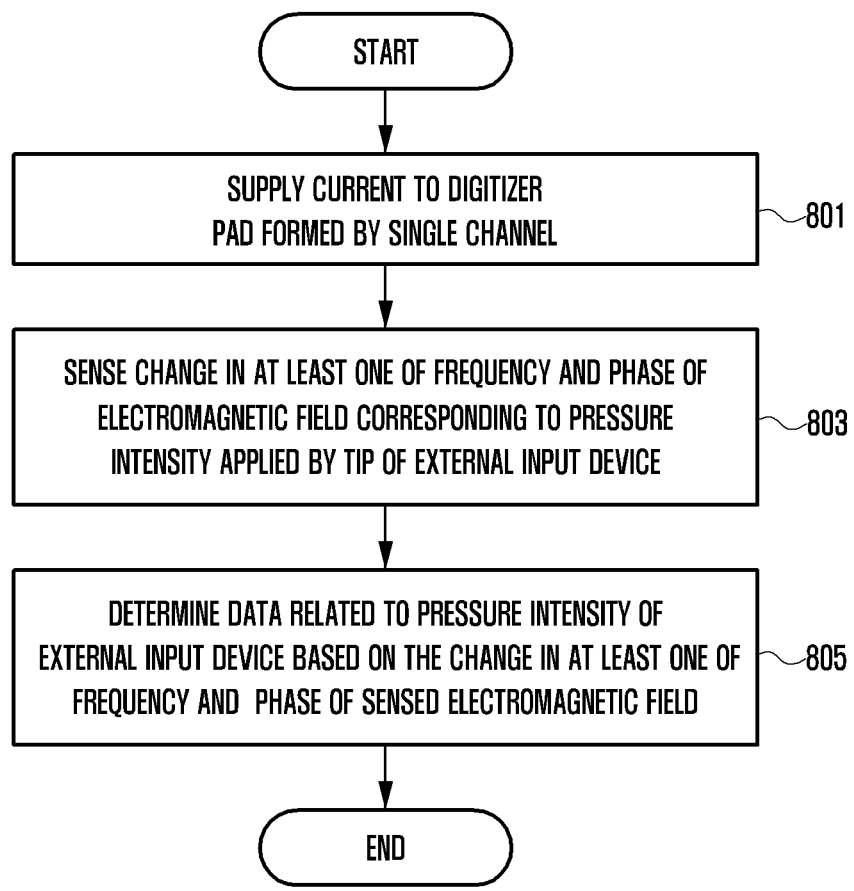
FIG. 8 is a flowchart illustrating a method for processing an input of the external input device, according to an embodiment of the present disclosure.

FIG. 8 is a flowchart illustrating a method processing an input of the external input device 600, according to an embodiment of the present disclosure.

At step 801, the digitizer pad controller 260 performs a control such that a current is supplied to the digitizer pad 250, which is formed by a single channel. A portion of the single channel may be connected to a ground which is a reference point of the voltage, and the other end of the single channel may be connected to the digitizer pad controller 260. The digitizer pad 250 generates an electromagnetic field by receiving an alternating current supplied from the digitizer pad controller 260.

At step 803, the digitizer pad controller 260 senses a change in at least one of a frequency and a phase of the electromagnetic field corresponding to the pressure intensity applied by the tip 610 of the external input device 600. In the external input device 600 including the resonance circuit unit, a current flows in the resonance circuit unit by electromagnetic induction, and an electromagnetic field is generated by the current. The digitizer pad controller 260 may sense the change in at least one of the frequency and the phase of the electromagnetic field, which varies depending on the pressure intensity of the external input device 600.

At step 805, the digitizer pad controller 260 determines the data related to the pressure intensity of the external input device 600 based on the change in at least one of the frequency and the phase of the sensed electromagnetic field. For example, when the pressure intensity of the external input device 600 in relation to the screen window 210 corresponds to level 700 with reference to the 1024 levels, the digitizer pad controller 260 may determine the data related to the sensed pressure intensity as the data corresponding to level 700. Here, the standard of the 1024 levels of the pressure intensity may mean a standard in which the strongest pressure intensity is defined as level 1024, and the weakest pressure intensity is defined as level 0.

The digitizer pad controller 260 transfers the determined data to the processor 120. The processor 120 may control a display 150 of the electronic device 101 to display a user interface corresponding to the transferred data.

The electrostatic capacitive touch panel controller 230 senses the amount of charges which varies as the 710 of the external input device 600 approaches the screen window 210, within a threshold distance from the screen window 210. The electrostatic capacitive touch panel controller 230 determines a position, at which the conductive tip 710 of the external input device 600 is sensed, based on the change of the sensed amount of charges.

Figure 9:
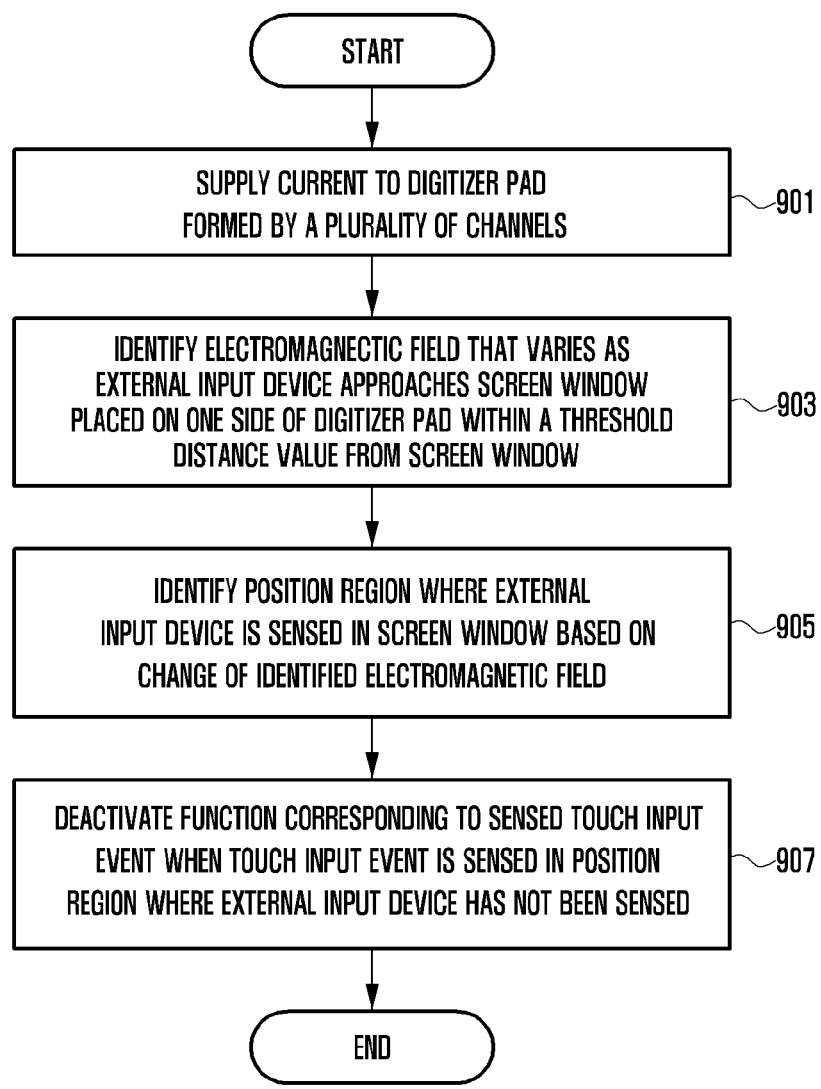
FIG. 9 is a flowchart illustrating a method for processing an input of the external input device, according to an embodiment of the present disclosure.

FIG. 9 is a flowchart illustrating a method for processing an input of the external input device 600, according to an embodiment of the present disclosure.

At step 901, the digitizer pad controller 260 supplies a current to the digitizer pad 250, which may be formed by a plurality of channels. The plurality of channels may be formed as a first single channel which encloses a first region of the screen window 210, and a second single channel which is a part of the first region or a second region, that are connected with each other. For example, the screen region of the screen window 210 may be enclosed by a first channel, a second channel, a third channel, and a fourth channel, and the regions may be divided according to the respective channels and may be classified into a first quadrant, a second quadrant, a third quadrant, and a fourth quadrant.

A portion of each of the plurality of channels may be connected to the switch unit 510. The other end of each of the channels (e.g., antennas 401, 403, 405, and 407) may be connected to a ground which is a reference point of the voltage.

At step 903, the digitizer pad controller 260 identifies the electromagnetic field that varies as the external input device 600 approaches the screen window 210, within a threshold distance from the screen window 210 placed on one side of the digitizer pad 250.

At step 905, the digitizer pad controller 260 identifies a position region in which the external input device 600 is sensed in the screen window 210 based on the identified electromagnetic field.

At step 907, when a touch input event is sensed in a position region, in which the external input device 600 has not been sensed, the processor 120 deactivates a function corresponding to the sensed touch input event. For example, when a separate input, performed by, for example, a palm of a human body, is sensed in at least one of the second quadrant, the third quadrant, and the fourth quadrant other than the first quadrant, in which the external input device 600 has been sensed, among the first quadrant, the second quadrant, the third quadrant, and the fourth quadrant, which are the regions divided according to the respective channels, the processor 120 may perform a control such that a function corresponding to the sensed separate input is deactivated.

When a touch input event is sensed in a position region positioned at a distance exceeding the threshold distance from the position region, in which the external input device 600 has been sensed, the processor 120 may deactivate a function corresponding to the touch input event. The processor 120 may deactivate a function corresponding to a touch input event based on a result obtained by comparing at least one of area information, voltage information, and concentration information of the position region, in which the external input device 600 has been sensed, and at least one of area information, voltage information, and concentration information of the position region, in which the touch input event is sensed.

For example, when a touch input event is sensed in a position region at a distance exceeding the threshold distance from the position region, in which the external input device 600 has been sensed, the processor 120 may deactivate a function corresponding to the touch input event. For example, the processor 120 may deactivate a function corresponding to a touch input event based on a result obtained by comparing at least one of area information, voltage information, and concentration information of the position region, in which the external input device 600 has been sensed, and at least one of area information, voltage information, and concentration information of the position region, in which the touch input event is sensed.

Figure 10:
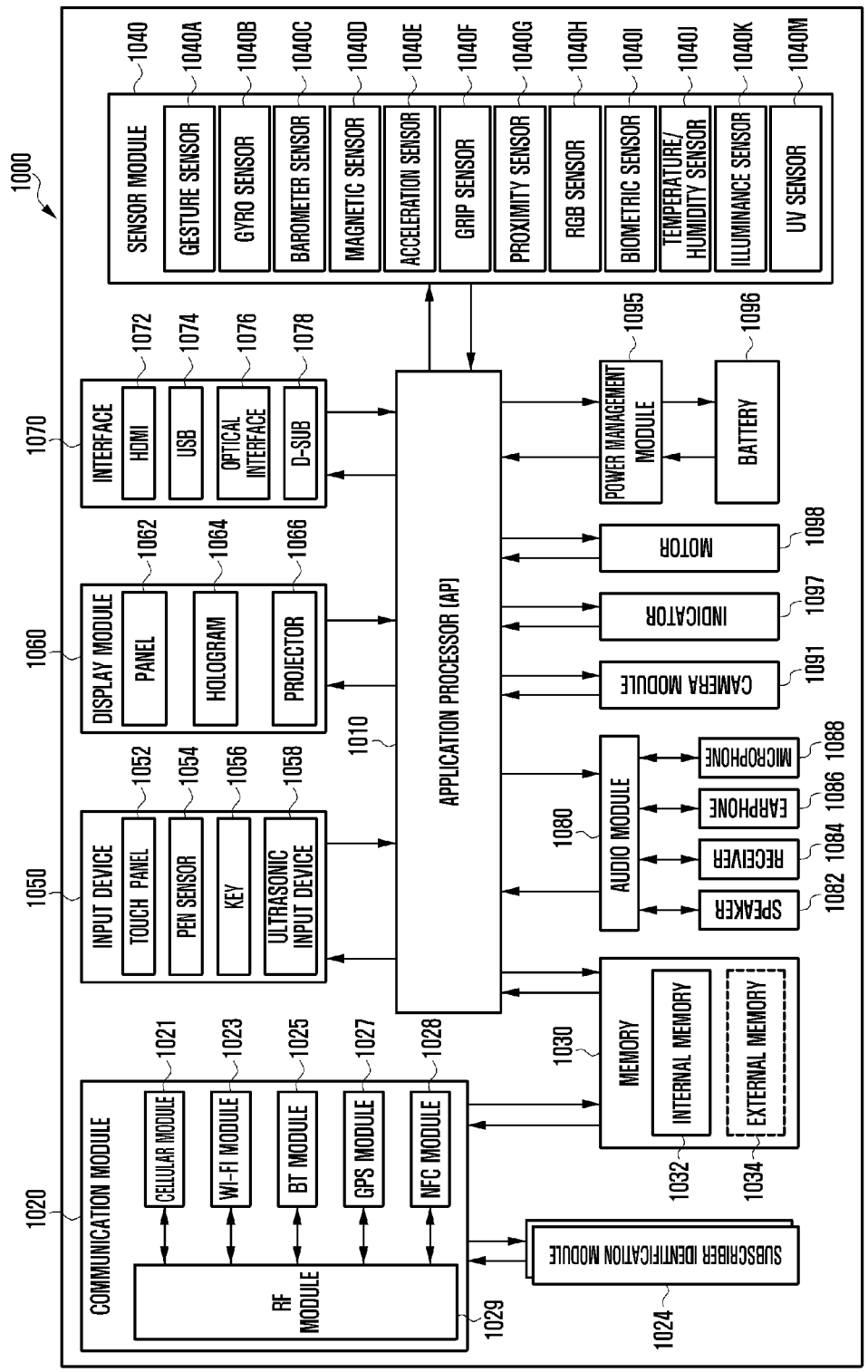
FIG. 10 illustrates an electronic device, according to an embodiment of the present disclosure.

FIG. 10 illustrates an electronic device, according to an embodiment of the present disclosure.

Referring to FIG. 10, the electronic device 1000 includes at least one AP 1010, a communication module 1020, a subscriber identification module (SIM) card 1024, a memory 1030, a sensor module 1040, an input unit 1050, a display 1060, an interface 1070, an audio module 1080, a camera module 1091, a power management module 1095, a battery 1096, an indicator 1097, and a motor 1098. The electronic device 1000 can include one or more components of the electronic device 101.

The AP 1010 may drive an operating system or applications, control a plurality of hardware or software components connected thereto, and also perform processing and operation for various data including multimedia data. The AP 1010 may be formed of a system-on-chip (SoC), for example. The AP 1010 may further include a graphics processing unit (GPU).

The communication module 1020 may perform a data communication with any other electronic device (e.g., the electronic device 104 or the server 106) connected to the electronic device 1000 through the network 162. The communication module 1020 may include a cellular module 1021, a Wi-Fi module 1023, a BT module 1025, a GPS module 1027, an NFC module 1028, and a radio frequency (RF) module 1029.

The cellular module 1021 may offer a voice call, a video call, a message service, an internet service, or the like through a communication network (e.g., LTE, LTE-A, CDMA, WCDMA, UMTS, WiBro, or GSM, etc.). Additionally, the cellular module 1021 may perform identification and authentication of the electronic device in the communication network, using the SIM card 1024. The cellular module 1021 may perform at least part of the functions the AP 1010 can provide. For example, the cellular module 1021 may perform at least part of a multimedia control function.

The cellular module 1021 may include a communication processor (CP). Additionally, the cellular module 1021 may be formed of an SoC, for example. Although some elements such as the cellular module 1021 (e.g., the CP), the memory 1030, or the power management module 1095 are shown as separate elements being different from the AP 1010 in FIG. 10, the AP 1010 may be formed to have at least part (e.g., the cellular module 1021) of the above elements.

The AP 1010 or the cellular module 1021 (e.g., the CP) may load commands or data, received from a nonvolatile memory connected thereto or from at least one of the other elements, into a volatile memory to process them. Additionally, the AP 1010 or the cellular module 1021 may store data, received from or created at one or more of the other elements, in the nonvolatile memory.

Each of the Wi-Fi module 1023, the BT module 1025, the GPS module 1027 and the NFC module 1028 may include a processor for processing data transmitted or received therethrough. Although FIG. 10 shows the cellular module 1021, the Wi-Fi module 1023, the BT module 1025, the GPS module 1027 and the NFC module 1028 as different blocks, at least part of these modules may be contained in a single IC chip or a single IC package. For example, at least part (e.g., the CP corresponding to the cellular module 1021 and a Wi-Fi processor corresponding to the Wi-Fi module 1023) of respective processors corresponding to the cellular module 1021, the Wi-Fi module 1023, the BT module 1025, the GPS module 1027 and the NFC module 1028 may be formed as a single SoC.

The RF module 1029 may transmit and receive data, e.g., RF signals or any other electric signals. Although not shown, the RF module 1029 may include a transceiver, a power amp module (PAM), a frequency filter, a low noise amplifier (LNA), or the like. The RF module 1029 may include any component, e.g., a wire or a conductor, for transmission of electromagnetic waves in a free air space. Although FIG. 10 shows that the cellular module 1021, the Wi-Fi module 1023, the BT module 1025, the GPS module 1027 and the NFC module 1028 share the RF module 1029, at least one of them may perform transmission and reception of RF signals through a separate RF module in an embodiment of the present disclosure.

The SIM card 1024 may be a specific card formed of SIM and may be inserted into a slot formed at a certain place of the electronic device 1000. The SIM card 1024 may contain therein an IC card identifier (ICCID) or an international mobile subscriber identity (IMSI).

The memory 1030 includes an internal memory 1032 and an external memory 1034. The internal memory 1032 may include, for example, at least one of a volatile memory (e.g., dynamic random access memory (DRAM), static RAM (SRAM), synchronous DRAM (SDRAM), etc.) or a nonvolatile memory (e.g., one time programmable read only memory (OTPROM), PROM, erasable and programmable ROM (EPROM), electrically erasable and programmable ROM (EEPROM), mask ROM, flash ROM, NAND flash memory, NOR flash memory, etc.).

The internal memory 1032 may have the form of a solid state drive (SSD). The external memory 1034 may include a flash drive, e.g., compact flash (CF), secure digital (SD), micro-SD, mini-SD, extreme digital (xD), memory stick, or the like. The external memory 1034 may be functionally connected to the electronic device 1000 through various interfaces. The electronic device 1000 may further include a storage device or medium such as a hard drive.

The sensor module 1040 may measure a physical quantity or sense an operating status of the electronic device 1000, and then convert measured or sensed information into electric signals. The sensor module 1040 may include, for example, at least one of a gesture sensor 1040A, a gyro sensor 1040B, an atmospheric sensor 1040C, a magnetic sensor 1040D, an acceleration sensor 1040E, a grip sensor 1040F, a proximity sensor 1040G, a color sensor 1040H (e.g., red, green, blue (RGB) sensor), a biometric sensor 1040I, a temperature-humidity sensor 1040J, an illumination sensor 1040K, and an ultraviolet (UV) sensor 1040M. Additionally or alternatively, the sensor module 1040 may include, e.g., an E-nose sensor, an electromyography (EMG) sensor, an electroencephalogram (EEG) sensor, an electrocardiogram (ECG) sensor, an infrared (IR) sensor, an iris scan sensor, or a finger scan sensor. Also, the sensor module 1040 may include a control circuit for controlling one or more sensors equipped therein.

The input unit 1050 may include a touch panel 1052, a digital pen sensor 1054, a key 1056, or an ultrasonic input unit 1058. The touch panel 1052 may recognize a touch input in a manner of capacitive type, resistive type, infrared type, or ultrasonic type. The touch panel 1052 may further include a control circuit. In case of a capacitive type, a physical contact or proximity may be recognized. The touch panel 1052 may further include a tactile layer. In this case, the touch panel 1052 may offer a tactile feedback to a user.

The digital pen sensor 1054 may be formed in the same or similar manner as receiving a touch input or by using a separate recognition sheet. The key 1056 may include, for example, a physical button, an optical key, or a keypad. The ultrasonic input unit 1058 is a specific device capable of identifying data by sensing sound waves with a microphone 1088 in the electronic device 1000 through an input tool that generates ultrasonic signals, thus allowing wireless recognition. The electronic device 1000 may receive a user input from any external device (e.g., the external device 600, a computer or a server) connected thereto through the communication module 1020.

The display 1060 may include a panel 1062, a hologram 1064, or a projector 1066. The panel 1062 may be, for example, a liquid crystal display (LCD), an active matrix organic light emitting diode (AM-OLED), or the like. The panel 1062 may have a flexible, transparent or wearable form. The panel 1062 may be formed of a single module with the touch panel 1052. The hologram 1064 may show a stereoscopic image in the air using interference of light. The projector 1066 may project an image onto a screen, which may be located at the inside or outside of the electronic device 1000. The display 1060 may further include a control circuit for controlling the panel 1062, the hologram 1064, and the projector 1066.

The interface 1070 may include, for example, an HDMI 1072, a USB 1074, an optical interface 1076, or a D-sub-miniature (D-sub) 1078. The interface 1070 may be contained, for example, in the communication interface 160 shown in FIG. 1. Additionally or alternatively, the interface 1070 may include, for example, a mobile high-definition link (MHL) interface, an SD card/multi-media card (MMC) interface, or an infrared data association (IrDA) interface.

The audio module 1080 may perform a conversion between sounds and electric signals. At least part of the audio module 1080 may be contained, for example, in the input/output interface 140 shown in FIG. 1. The audio module 1080 may process sound information inputted or outputted through a speaker 1082, a receiver 1084, an earphone 1086, or a microphone 1088.

The camera module 1091 is a device capable of obtaining still images and moving images. The camera module 1091 may include at least one image sensor (e.g., a front sensor or a rear sensor), a lens, an image signal processor (ISP), or a flash (e.g., LED or xenon lamp, not shown).

The power management module 1095 may manage electric power of the electronic device 1000. Although not shown, the power management module 1095 may include, for example, a power management IC (PMIC), a charger IC, or a battery or fuel gauge.

The PMIC may be formed, for example, of an IC chip or an SoC. Charging may be performed in a wired or wireless manner. The charger IC may charge a battery 1096 and prevent overvoltage or overcurrent from a charger. The charger IC may have a charger IC used for at least one of wired and wireless charging types. A wireless charging type may include, for example, a magnetic resonance type, a magnetic induction type, or an electromagnetic type. Any additional circuit for a wireless charging may be further used such as a coil loop, a resonance circuit, or a rectifier.

The battery gauge may measure the residual amount of the battery 1096 and a voltage, current or temperature in a charging process. The battery 1096 may store or create electric power therein and supply electric power to the electronic device 1000. The battery 1096 may be, for example, a rechargeable battery or a solar battery.

The indicator 1097 may show thereon a current status (e.g., a booting status, a message status, or a recharging status) of the electronic device 1000 or of its part (e.g., the AP 1010). The motor 1098 may convert an electric signal into a mechanical vibration. Although not shown, the electronic device 1000 may include a specific processor (e.g., GPU) for supporting a mobile TV. This processor may process media data that comply with standards of digital multimedia broadcasting (DMB), digital video broadcasting (DVB), or media flow.

Figure 11:
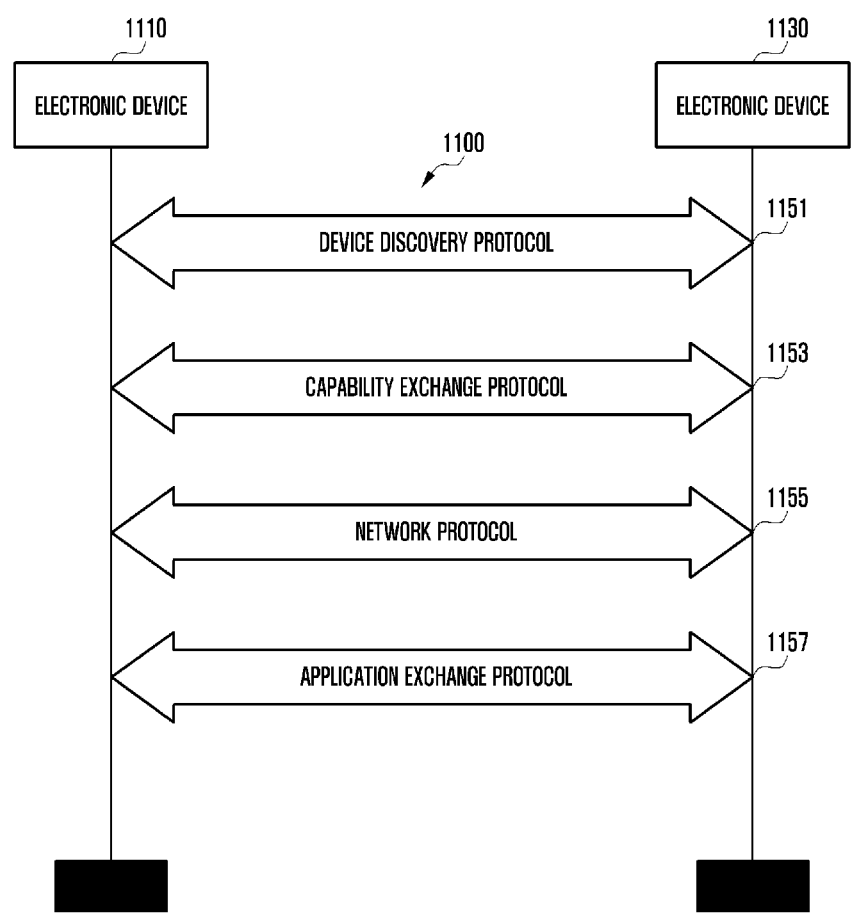
FIG. 11 is a signaling diagram illustrating a protocol exchange between electronic devices, according to an embodiment of the present disclosure.

FIG. 11 is a signaling diagram illustrating a communication protocol between a plurality of electronic devices, according to an embodiment of the present invention. In FIG. 11, the electronic devices 1100 and 1130 can include one or more components associated with the electronic devices 101 and 1000, the external electronic device 104, or the server 106.

Referring to FIG. 11, the communication protocol 1100 may include a device discovery protocol 1151, a capability exchange protocol 1153, a network protocol 1155, and an application protocol 1157.

The device discovery protocol 1151 may be a protocol that allows the electronic device 1110 and the electronic device 1130 to detect an external electronic device which can be connected thereto through short-range communication or connects the found external electronic device thereto. For example, the electronic device 1110 may detect the electronic device 1130 as a device, which can communicate with the electronic device 1110, through a short-range communication method (for example, BT and the like) using the device discovery protocol 1151. The electronic device 1110 may acquire and store identification information of the electronic device 1130 detected through the device discovery protocol 1151 for a communication connection with the electronic device 1130. For example, the electronic device 1110 may establish the communication connection with the electronic device 1130 at least based on the identification information. The device discovery protocol 1151 may be a protocol for authenticating a plurality of electronic devices. For example, the electronic device 1110 may perform an authentication between the electronic device 1110 and the electronic device 1130 based on communication information (for example, a media access control (MAC) address, a universally unique identifier (UUID), a subsystem identification (SSID), and an information provider (IP) address) for the connection with the electronic device 1130.

The capability exchange protocol 1153 may be a protocol for exchanging information related to a service function which can be supported by at least one of the electronic device 1110 and the electronic device 1130. For example, the electronic device 1110 and the electronic device 1130 may exchange information related to a service function currently provided by each of the electronic device 1110 and the electronic device 1130 through the capability exchange protocol 1153. The information which can be exchanged between the electronic devices may include identification information indicating a particular service among a plurality of services which can be supported by the electronic device 1110 and the electronic device 1130. For example, the electronic device 1110 may receive, from the electronic device 1130, identification information of a particular service provided by the electronic device 1130 through the capability exchange protocol 1153. In this case, the electronic device 1110 may determine whether the electronic device 1110 can support the particular service based on the received identification information.

The network protocol 1155 may be a protocol for controlling flows of data which is transmitted/received to provide a service linked between the electronic device 1110 and the electronic device 1130 which are connected to communicate with each other. For example, at least one of the electronic device 1110 and the electronic device 1130 may control an error or data quality by using the network protocol 1155. Additionally or alternatively, the network protocol 1155 may determine a transport format of data transmitted/received between the electronic device 1110 and the electronic device 1130. Further, at least one of the electronic device 1110 and the electronic device 1130 may at least manage a session (for example, connect or terminate a session) for a data exchange between the electronic devices by using the network protocol 1155.

The application protocol 1157 may be a protocol for providing a process or information for exchanging data related to a service provided to an external electronic device. For example, the electronic device 1110 may provide a service to the electronic device 1130 through the application protocol 1157. The communication protocol 1100 may include a standard communication protocol, a communication protocol designated by an individual or organization (for example, a communication protocol self-designated by a communication device manufacturing company or a network supplying company) or a combination thereof.

Each of the above-discussed elements of the electronic devices disclosed herein may be formed of one or more components, and its name may be varied according to the type of the electronic device. The electronic devices disclosed herein may be formed of at least one of the above-discussed elements without some elements or with additional other elements. Some of the elements may be integrated into a single entity that still performs the same functions as those of such elements before integrated.

The apparatuses and methods of the disclosure can be implemented in hardware, and in part as firmware or as software or computer code in conjunction with hardware that is stored on a non-transitory machine readable medium such as a compact disc ROM (CD ROM), a RAM, a floppy disk, a hard disk, or a magneto-optical disk, or computer code downloaded over a network originally stored on a remote recording medium or a non-transitory machine readable medium and stored on a local non-transitory recording medium for execution by hardware such as a processor, so that the methods described herein are loaded into hardware such as a general purpose computer, or a special processor or in programmable or dedicated hardware, such as an ASIC or FPGA. As would be understood in the art, the computer, the processor, microprocessor, controller, control unit or other programmable hardware include memory components, e.g., RAM, ROM, flash, etc. that may store or receive software or computer code that when accessed and executed by the computer, processor or hardware implement the processing methods described herein.

The above-discussed method is described herein with reference to flowchart illustrations of user interfaces, methods, and computer program products according to embodiments of the present disclosure. It will be understood that each block of the flowchart illustrations, and combinations of blocks in the flowchart illustrations, can be implemented by computer program instructions.

These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks. These computer program instructions may also be stored in a computer usable or non-transitory computer-readable memory that can direct a computer or other programmable data processing apparatus to function in a particular manner, such that the instructions stored in the computer usable or non-transitory computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that are executed on the computer or other programmable apparatus provide operations for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

According to various embodiments of the present disclosure, a non-transitory computer-readable storage medium in which a program is stored, the program including instructions which when executed perform a method of processing an input of an electronic device, the method includes supplying, by a digitizer pad controller, a current to a digitizer pad formed by a single channel, sensing, by the digitizer pad controller, a change in at least one of a frequency and a phase of an electromagnetic field corresponding to a pressure intensity that is applied by a tip of an external input device, and determining, by the digitizer pad controller, data related to the pressure intensity applied by the external input device based on the change in at least one of the frequency and the phase of the sensed electromagnetic field.

While the present disclosure has been shown and described with reference to certain embodiments thereof, it should be understood by those skilled in the art that many variations and modifications of the method and apparatus described herein will still fall within the spirit and scope of the present invention as defined in the appended claims and their equivalents.

What is claimed is:

1. An electronic device comprising:
   a digitizer pad formed by a plurality of antennas and configured to detect an electromagnetic field, each of the plurality of antennas formed surrounding each of regions of a screen window placed on one side of the digitizer pad;
   an electrostatic capacitive touch panel configured to detect a touch input;
   a digitizer pad controller configured to:
   supply a current to the digitizer pad;
   identify a change in at least one of a frequency and a phase of the electromagnetic field corresponding to a pressure intensity applied by a tip of an external input device;
   determine data related to the pressure intensity applied by the external input device based on the change in the at least one of the frequency and the phase of the electromagnetic field;
   identify a change in the electromagnetic field as the external input device approaches the screen window within a threshold distance from the screen window; and
   determine a first region of the screen window corresponding to one of the plurality of antennas in which the approach of the external input device is detected based on the identified change in the electromagnetic field; and
   a processor configured to:
   determine a second region of the screen window corresponding to a position at which the touch input is detected on the electrostatic capacitive touch panel;
   determine whether the first region and the second region are different; and
   deactivate a function corresponding to the touch input based on whether the first region and the second region are different.

2. The electronic device of claim 1, wherein the digitizer pad controller is configured to transfer the determined data related to the pressure intensity to the processor, and wherein the processor is configured to control a display of the electronic device to display a user interface corresponding to the transferred data.

3. The electronic device of claim 2, further comprising:
an electrostatic capacitive touch panel controller configured to supply a voltage to the electrostatic capacitive touch panel placed on one side of the screen window, acquire an amount of charges which varies as the tip of the external input device approaches the screen window within a threshold distance from the screen window through the electrostatic capacitive touch panel, and determine a position of the external input device based on the acquired amount of charges.

4. The electronic device of claim 1, wherein
the tip extends from an open end of an external housing and includes a conductive material, and
wherein the external housing has a cavity formed therein that is configured to receive a proximal end of the tip and support a resonance circuit unit including an inductor, a capacitor, and a printed circuit board.

5. The electronic device of claim 4, wherein the external input device further includes a conductor that is mounted in the cavity of the external housing, and wherein the conductor includes a proximal end that connects to the printed circuit board and a distal end that is seated within a cavity of the tip for connecting the conductor to the tip.

6. The electronic device of claim 4, wherein the external input device further includes a conductor mounted in the cavity of the external housing.

7. The electronic device of claim 1, wherein the plurality of antennas are formed by connecting a first antenna, which is formed by enclosing the first region of the screen window, and a second antenna, which is formed by enclosing one of a part of the first region and the second region, to at least one of a repeater, a combiner, and a splitter.

8. The electronic device of claim 1, wherein the processor is further configured to:
deactivate a function corresponding to a touch input event when the touch input event is sensed in the second region spaced away from the first region where the external input device has been sensed, by a distance exceeding a threshold distance; and
deactivate a function corresponding to a touch input event based on a comparison between at least one of area information, voltage information, and concentration information of the first region where the external input device has been sensed and at least one of area information, voltage information, and concentration information of the second region where the touch input event has been sensed.

9. A method of processing an input of an electronic device, the method comprising:
supplying, by a digitizer pad controller, a current to a digitizer pad formed by a plurality of antennas, each of the plurality of antennas formed surrounding each of regions of a screen window of the electronic device placed on one side of the digitizer pad;
identifying, by the digitizer pad controller, a change in at least one of a frequency and a phase of an electromagnetic field corresponding to a pressure intensity that is applied by a tip of an external input device;
determining, by the digitizer pad controller, data related to the pressure intensity applied by the external input device based on the change in the at least one of frequency and the phase of the electromagnetic field;
identifying, by the digitizer pad controller, a change in the electromagnetic field as the external input device approaches the screen window within a threshold distance from the screen window;
determining, by the digitizer pad controller, a first region of the screen window corresponding to one of the plurality of antennas in which the approach of the external input device is detected based on the identified change in the electromagnetic field;
determining, by a processor, a second region of the screen window corresponding to a position at which the touch input is detected on the electrostatic capacitive touch panel;
determining whether the first region and the second region are different; and
deactivating, by the processor, a function corresponding to the touch input based on whether the first region and the second region are different.

10. The method of claim 9, further comprising:
transferring, by the digitizer pad controller, the determined data related to the pressure intensity to the processor; and
controlling, by the processor, a display of the electronic device to display a user interface corresponding to the transferred data.

11. The method of claim 10, further comprising:
supplying, by an electrostatic capacitive touch panel controller, a voltage to the electrostatic capacitive touch panel placed on one side of the screen window;
acquiring, by the electrostatic capacitive touch panel, charges of which the amount varies when the tip of the external input device approaches the screen window within a threshold distance from the screen window; and
determining, by the electrostatic capacitive touch panel controller, a position where the tip of the external input device is sensed based on the amount of charges acquired through the electrostatic capacitive touch panel.

12. The method of claim 9, wherein the tip extends from an open end of the external housing and includes a conductive material, and
wherein the external housing has a cavity formed therein that is configured to receive a proximal end of the tip and support a resonance circuit unit including an inductor, a capacitor, and a printed circuit board.

13. The method of claim 12, wherein the external input device further includes a conductor that is mounted in the cavity of the external housing, and wherein the conductor includes a proximal end that connects to the printed circuit board and a distal end that is seated within a cavity of the tip for connecting the conductor to the tip.

14. The method of claim 12, wherein the external input device further includes a conductor mounted in the cavity of the external housing.

15. The method of claim 9, wherein the plurality of antennas are formed by connecting a first antenna, which is formed by enclosing the first region of the screen window, and a second antenna, which is formed by enclosing a part of the first region or the second region, to at least one of a repeater, a combiner, and a splitter.

16. The method of claim 15, wherein deactivating, by the processor, the function corresponding to the touch input further comprises:
deactivating, by the processor, a function corresponding to a touch input event when the touch input is sensed in the second region spaced away from the first region where the external input device has been sensed, by a distance exceeding a threshold distance; and deactivating, by the processor, a function corresponding to a touch input event based on a comparison between at least one of area information, voltage information, and concentration information of the first region where the external input device has been sensed and at least one of area information, voltage information, and concentration information of the second region where the touch input event has been sensed.

17. A non-transitory computer-readable storage medium in which a program is stored, the program including instructions which when executed perform a method of processing an input of an electronic device, the method comprising:

supplying, by a digitizer pad controller, a current to a digitizer pad formed by a plurality of antennas, each of the plurality of antennas formed surrounding each of regions of a screen window placed on one side of the digitizer pad;

identifying, by the digitizer pad controller, a change in at least one of a frequency and a phase of an electromagnetic field corresponding to a pressure intensity that is applied by a tip of an external input device;

determining, by the digitizer pad controller, data related to the pressure intensity applied by the external input device based on the change in the at least one of frequency and the phase of the electromagnetic field;

identifying, by the digitizer pad controller, a change in the electromagnetic field as the external input device approaches the screen window within a threshold distance from the screen window;

determining, by the digitizer pad controller, a first region of the screen window corresponding to one of the plurality of antennas in which the approach of the external input device is detected based on the identified change in the electromagnetic field;

determining, by a processor, a second region of the screen window corresponding to a position at which the touch input is detected on the electrostatic capacitive touch panel;

determining, by the processor, whether the first region and the second region are different; and deactivating, by the processor, a function corresponding to the touch input based on whether the first region and the second region are different.

* * * * *